(12) United States Patent
Komuro et al.

(10) Patent No.: US 7,973,432 B2
(45) Date of Patent: Jul. 5, 2011

(54) MICROSCOPE SYSTEM AND CONTROL METHOD FOR SAME

(75) Inventors: Toshiya Komuro, Tokyo (JP); Hideaki Endo, Tokyo (JP)

(73) Assignee: Olympus Corporation, Tokyo (JP)

( * ) Notice: Subject to any disclaimer, the term of this patent is extended or adjusted under 35 U.S.C. 154(b) by 199 days.

(21) Appl. No.: 12/485,163

(22) Filed: Jun. 16, 2009

(65) Prior Publication Data

US 2009/0316257 A1    Dec. 24, 2009

(30) Foreign Application Priority Data

Jun. 23, 2008    (JP) .................................. 2008-163719

(51) Int. Cl.
*H01H 31/10*    (2006.01)
(52) U.S. Cl. ..................................................... 307/115
(58) Field of Classification Search .................... 307/115
See application file for complete search history.

(56) References Cited

U.S. PATENT DOCUMENTS
5,850,038 A * 12/1998 Ue ................................. 73/105

FOREIGN PATENT DOCUMENTS
| JP | 08-043738 A | 2/1996 |
| JP | 3482247 B2 | 10/2003 |
| JP | 2006-195274 A | 7/2006 |

* cited by examiner

*Primary Examiner* — Robert L. Deberadinis
(74) *Attorney, Agent, or Firm* — Holtz, Holtz, Goodman & Chick, PC

(57) ABSTRACT

The microscope system comprises: an imaging apparatus used for picking up an image of a specimen; an electric unit; a control apparatus for controlling turning On and Off of the power supply to the electric unit; a storage apparatus storing the initialization requirement time of the electric unit; and a drive management arithmetic operation apparatus for calculating, on the basis of an image pickup interval and initialization requirement time, a clock time for controlling turning On/Off of the power supply to the electric unit.

19 Claims, 13 Drawing Sheets

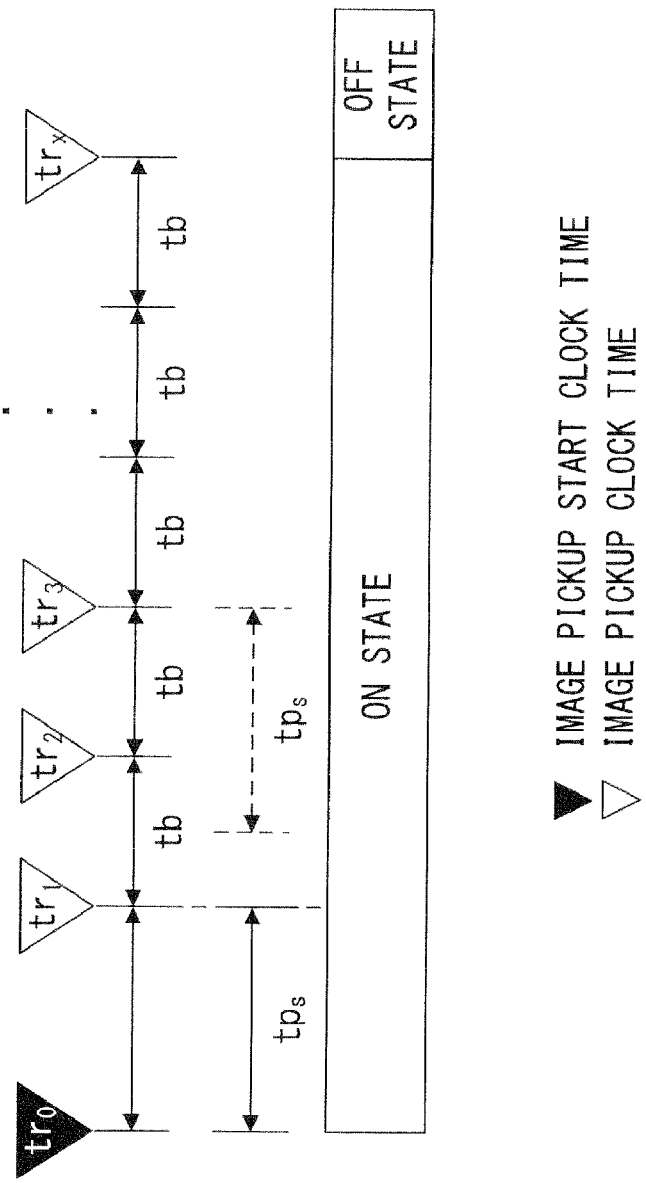
F I G. 5B

MICROSCOPE SYSTEM AND CONTROL METHOD FOR SAME

CROSS REFERENCE TO RELATED APPLICATIONS

This application claims the benefit of Japanese Application No. 2008-163719, filed on Jun. 23, 2008, the contents of which are incorporated by this reference.

BACKGROUND OF THE INVENTION

1. Field of the Invention

The present invention relates to a technique related to a microscope system and in particular to a technique related to an electric control system.

2. Description of the Related Art

In the field of microscope systems, recent years have witnessed the demands for observation capabilities becoming increasingly diverse, and associated with the diverse demands, observation methods have also been increasingly diverse. As an example of demands for observation capabilities, there is a requirement for observing a change in a specimen over an extended period of time. An example of an observation method attaining the requirement is time-lapse photography in which a specimen is photographed at intervals (i.e., ranging from a few seconds to a few hours) desired by a user during the observation period of time.

If a microscope system is manually operated in observation methods such as time-lapse photography and the observation period takes an extended length of time, the load levied on an observer is large and it is very difficult to secure the necessary manpower. Therefore, there is a strong demand to automate the operation for such an observation method. As a result, a microscope system employing the aforementioned method is equipped with a large number of electric units (i.e., electric parts and an illumination unit) for implementing the automation. Many of these electric units continue to consume electric power for an extended length of time, resulting in an increase in the calorific power over time.

In an observation using a microscope, there are many cases in which an increase in the internal temperature of a specimen is undesirable in terms of the characteristics of the observation. Examples of this include an observation of a live cell for an extended time period, an observation in which temperature drift associated with increased definition must be strictly avoided, and an observation performed under reduced darkness output when photographing at a high sensitivity.

Various methods have accordingly been devised to stop operating electric parts and illumination devices in order to suppress the power consumption and heat generation as disclosed in, for example, Japanese Registered Patent 3482247 and Laid-Open Japanese Patent Application Publication No. 2006-195274.

The aforementioned related techniques, however, focused only on stopping non-operated parts, do not describe any aspect of a recovery operation. Consequently, it is very difficult to apply these techniques to a complex time-lapse photography involving a plurality of photographing intervals and observation methods. Further, if a device requiring a certain period of time between the initiation and stable state is used, a photograph is sometimes taken before the preparation of the device is completed, even when no such taking of a photograph is desired by a user. Further, such a taking of a photograph sometimes degrades the image quality of the photographed image or spoils the taking of photographs.

SUMMARY OF THE INVENTION

According to one aspect of the present invention, a microscope system comprises: an imaging apparatus for picking up an image of a specimen; an electric unit; a control apparatus for controlling the turning On/Off of the power supply to the electric unit; a storage apparatus recording the initialization requirement period of the electric unit; aid a drive management arithmetic operation apparatus for calculating, on the basis of an image pickup interval and the initialization requirement period, a clock time for controlling the turning On/Off of the power supply to the electric unit.

According to another aspect of the present invention, a control method applied to a microscope system for imaging a specimen is a method, comprising: a first step for comparing an image pickup interval with the initialization requirement period of an electric system; a second step for controlling the turning On/Off of the power supply to the electric system on the basis of the comparison result performed in the first step; and a third step for picking up an image of the specimen.

BRIEF DESCRIPTION OF THE DRAWINGS

The present invention will be more apparent from the following detailed description when the accompanying drawings are referred to.

FIG. 5B is a diagram showing a temporal change in the state of an illumination apparatus resulting from the control, exemplified in FIGS. 4A and 4B, in a case in which the image pickup interval is equal to or shorter than a length of time required for the lighting state of a lamp to be stabilized;

DESCRIPTION OF THE PREFERRED EMBODIMENTS

The following is a description of the preferred embodiment of the present invention with reference to the accompanying drawings.

Embodiment 1

Figure 1:
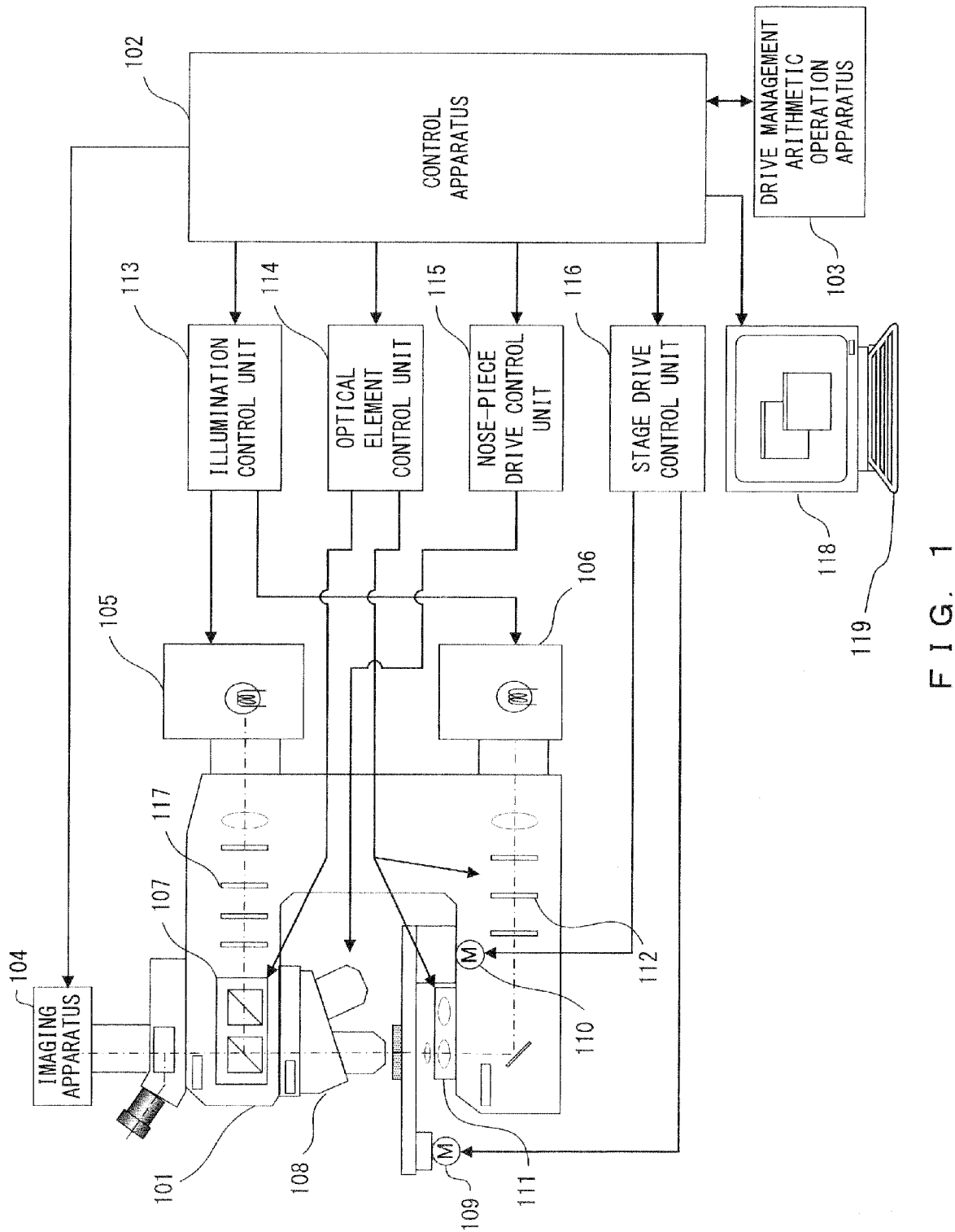
FIG. 1 is a conceptual diagram showing a microscope system according to a preferred embodiment of the present invention.

FIG. 1 is a conceptual diagram showing a microscope system according to a preferred embodiment of the present invention. The microscope system shown in FIG. 1 comprises: a microscope apparatus main body 101; a control apparatus 102 for controlling the entirety of the microscope system; a drive management arithmetic operation apparatus 103 for managing the ON/OFF timings of individual electric units; an imaging apparatus 104 for obtaining the image of a specimen; an illumination control unit 113 for controlling an illumination unit in accordance with an instruction signal from the control apparatus 102; an optical element control unit 114 for controlling the drive of an optical element in order to change over the microscopy methods between an epi-illumination and a transmissive illumination; a nose-piece drive control unit 115 for changing over objective lenses by driving the nose-piece when magnification ratios are changed; and a stage drive control unit 116 for controlling the drive unit of a motorized stage enabled to be driven in the optical axis direction and the horizontal direction that is perpendicular to the optical axis. Further, the control apparatus 102 comprises an operation unit 119 for receiving an instruction from a user.

The imaging apparatus 104 is a common CCD (Charge Coupled Device) digital camera. All functions of the imaging apparatus 104, such as the turning on/off of the power supply, the adjusting the timings for imaging, the adjusting the exposure time and the adjusting the shutter speed are controlled by the control apparatus 102.

The microscope apparatus main body 101 comprises a motorized stage enabled to be driven in the optical axis direction and horizontal direction with a specimen mounted thereon. The motorized stage is driven by actuators 109 and 110 when they receive a control signal from the stage drive control unit 116. Further, the motorized stage is enabled to designate a coordinate for each region of a specimen by means of the origin detection function on the basis of an origin sensor (not shown in a drawing herein).

The microscope apparatus main body 101 also comprises an illumination unit used for illuminating a specimen. The present embodiment comprises, as the illumination unit, two kinds of lamps, that is, a fluorescent observation lamp 105 for performing a fluorescent observation and a transmissive observation lamp 106 for performing a specimen with a light beam transmitting itself through the specimen. Both of these lamps are controlled for the turning ON/OFF of the power source in accordance with a control signal from the illumination control unit 113. Note that the fluorescent observation lamp 105 and transmissive observation lamp 106, which are commonly used for a microscope, are halogen lamp or arc lamp light sources. These lamps require a certain period of time between being powered on and obtaining stable emission.

The microscope apparatus main body 101 also comprises a motorized nosepiece 108 equipped with a plurality of objective lenses and enabled to be rotated. The motorized nose-piece 108 internally comprises an actuator. The actuator is capable of rotating at an arbitrary angle in accordance with a control signal from the nose-piece drive control unit 115. This configuration makes it possible to insert an arbitrary objective lens into an observation light path.

The microscope apparatus main body 101 further comprises an electric fluorescent mirror cube cassette 107 for guiding an excitation light illuminating a specimen and a fluorescent light emitted from the specimen to the respectively desired light paths when a fluorescent observation is carried out and comprises an electric fluorescent observation optical system 117. The electric fluorescent observation optical system 117 comprises: an electric shutter for shielding light emitted from the fluorescent observation lamp 105; an electric neutral density (ND) filter unit for adjusting, the light path, the light intensity of the fluorescent observation lamp 105; an aperture stop for adjusting the numerical aperture of the light obtained from the fluorescent observation lamp; and a field stop for adjusting the field of the microscope.

The microscope apparatus main body 101 further comprises an electric condenser 111 enabled to electrically adjust the numerical aperture of the illumination light irradiated onto a specimen when a transmissive illumination observation is carried out and comprises an electric transmissive observation optical system 112. The electric transmissive observation optical system 112 is constituted by an electric ND filter unit for adjusting the light intensity of the transmissive observation lamp in the light path and by a field stop for adjusting the field of the microscope.

The microscope apparatus main body 101 further comprises actuators and sensors inside of the individual parts. The optical element control unit 114 transmits and receives control signals to and from these actuators and sensors. Note that the optical element control unit 114 is controlled by the control apparatus 102.

Figure 2:
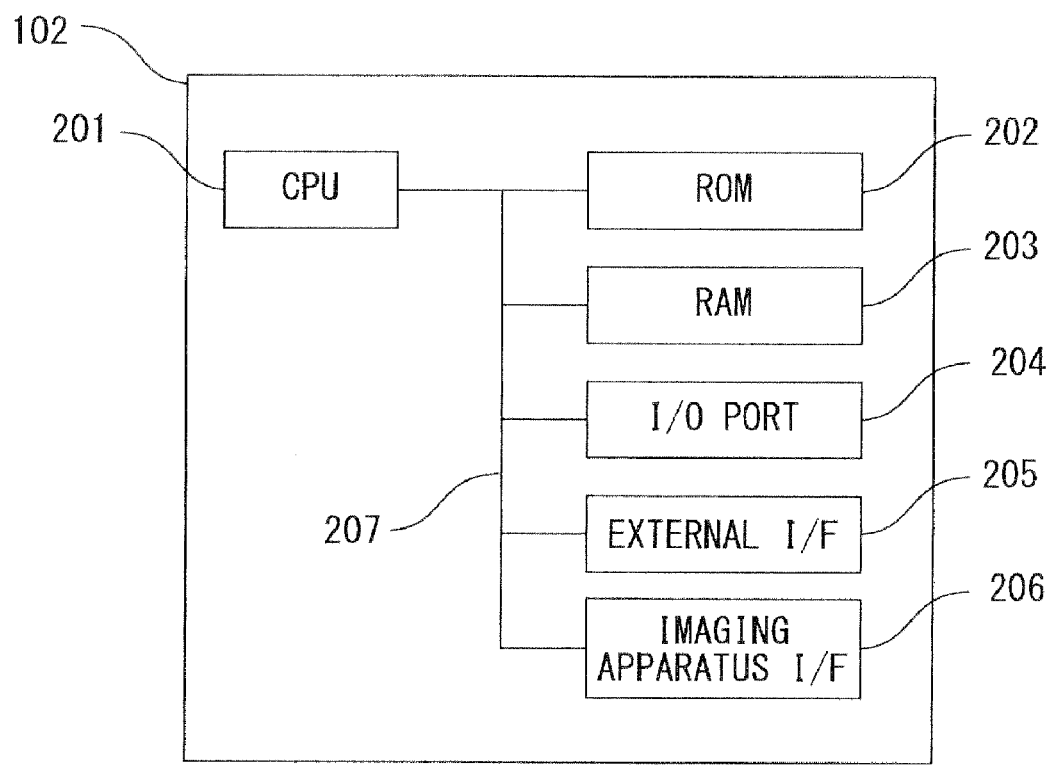
FIG. 2 is a conceptual diagram showing the comprisal of the control apparatus of a microscope system according to a preferred embodiment of the present invention.

The control apparatus 102 is an electronic circuit that includes a central processing unit (CPU). As an example, the control apparatus 102 comprises: a CPU 201; read only memory (ROM) 202 for storing a program used for controlling the microscope system; random access memory (RAM) 203 for storing data necessary for various controls; an input/output (I/O) port 204 for inputting and outputting a control signal; an external interface (I/F) 205 used for connecting external devices (e.g., a host computer); an imaging apparatus I/F 206 through which the imaging apparatus is controlled and the obtained data thereof is transferred; and a data bus 207, as shown in FIG. 2. The control apparatus 102 uses the aforementioned components to control peripheral devices. Meanwhile, the control apparatus 102 may alternatively be controlled by an external host computer by way of the external I/F 205.

Figure 3:
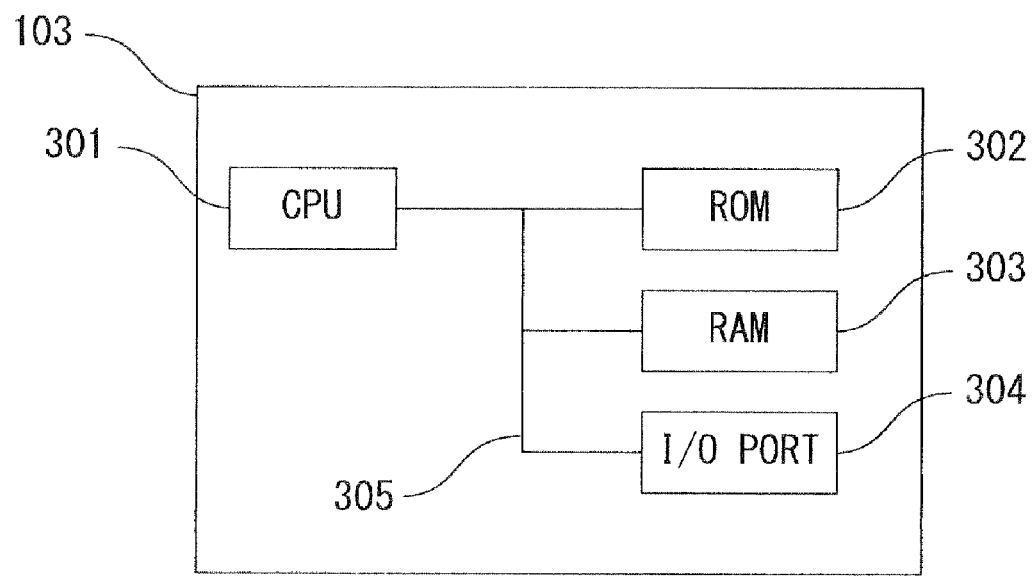
FIG. 3 is a conceptual diagram showing the comprisal of the drive management arithmetic operation apparatus in a microscope system according to a preferred embodiment of the present invention.

The drive management arithmetic operation apparatus 103 is an electronic circuit that includes a CPU. As shown in FIG. 3, the drive management arithmetic operation apparatus 103 comprises: a CPU 301; ROM 302 for storing a program used for arithmetically operating (also simply noted as "calculating" hereinafter) the timing for the turning on/off of the power supply to an electric unit; RAM 303 for storing data used for the arithmetic operation; an I/O port 304 for inputting and outputting a control signal and the data from and to the control apparatus 102; and a data bus 305 for exchanging signals internally in the drive management arithmetic operation apparatus 103.

Note that the I/O port 304 is connected to the I/O port 204 of the control apparatus 102. Therefore, the drive management arithmetic operation apparatus 103 is enabled to access the data stored in the RAM 203 of the control apparatus 102 and various I/Fs. Further, ROM 302 may possibly store not only a program used for calculating the ON/OFF timing(s) for the electric unit(s), but also various parameters such as an initialization requirement period (of time) pertaining to each respective unit and a time from start to stop pertaining thereto. In such a case, the ON/OFF timing will be calculated in consideration of the time. Note that the aforementioned "initialization requirement period" is defined as the period between the turning On of the power supply to an electric unit and the starting thereof. Further, the initialization requirement period may further include the period between the startup of an electric unit and the stable operation thereof.

The microscope system is constituted by the devices and optical elements described above. A specimen placed on the motorized stage is illuminated by the fluorescent observation lamp 105 or transmissive observation lamp 106 in the microscope system. The fluorescent light, reflection light and transmissive light generated in the specimen are guided to the imaging apparatus 104 by way of an objective lens mounted onto the motorized nose-piece and by way of a series of observation optical systems. The imaging apparatus 104 in turn generates image data and sends it to the control apparatus 102. The control apparatus in turn displays an image on a monitor 118.

Note that the control apparatus 102, drive management arithmetic operation apparatus 103, various control units, monitor 118 and operation unit 119 may be substituted by a common computer. In such a case, the microscope system is configured to include the computer and microscope apparatus main body.

<Exemplary Operation 1>

Figure 4A:
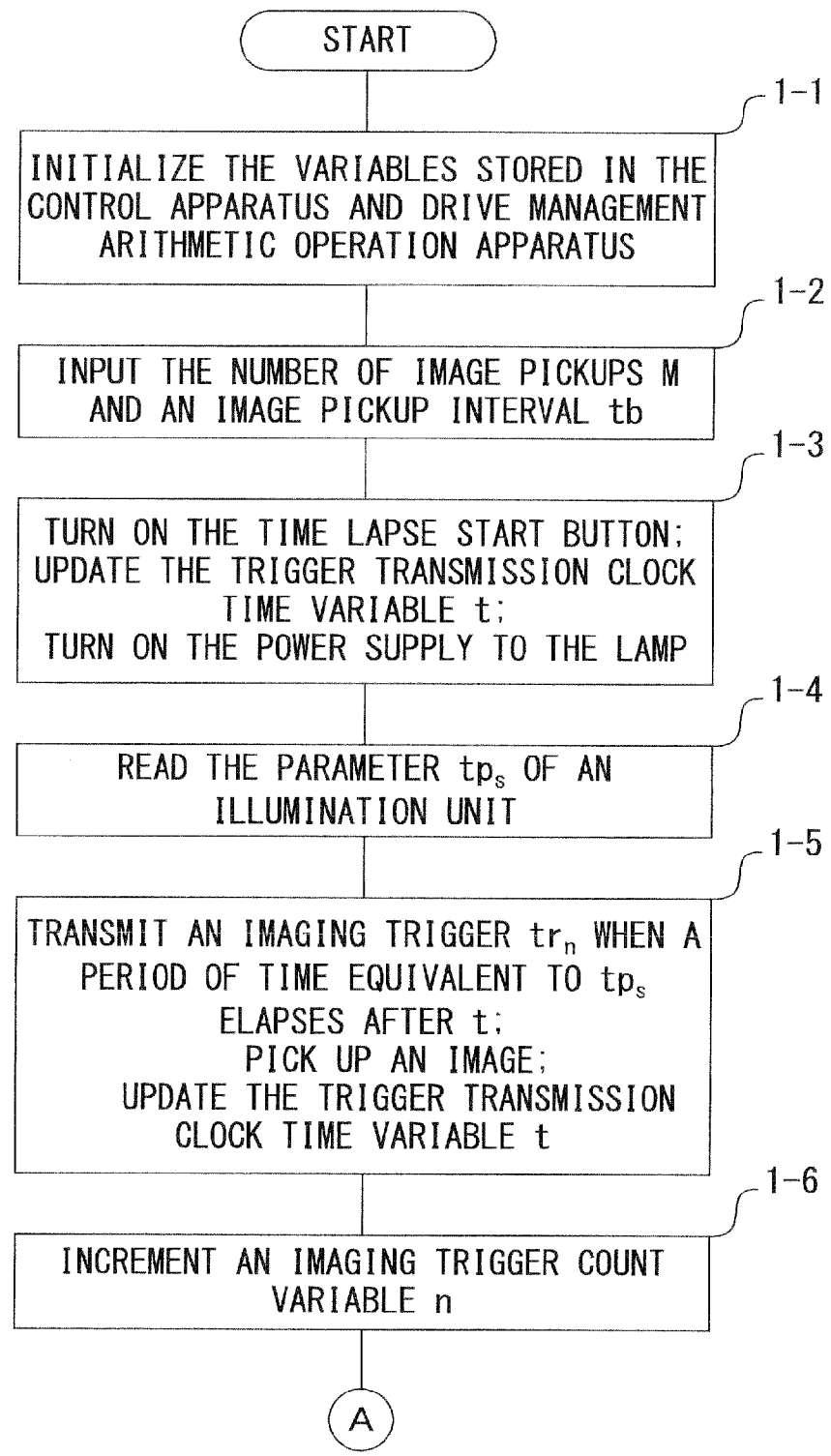
FIGS. 4A and 4B are flow charts showing an ON/OFF control of the power supply to an illumination apparatus when the image pickup intervals are constant.
Figure 4B:
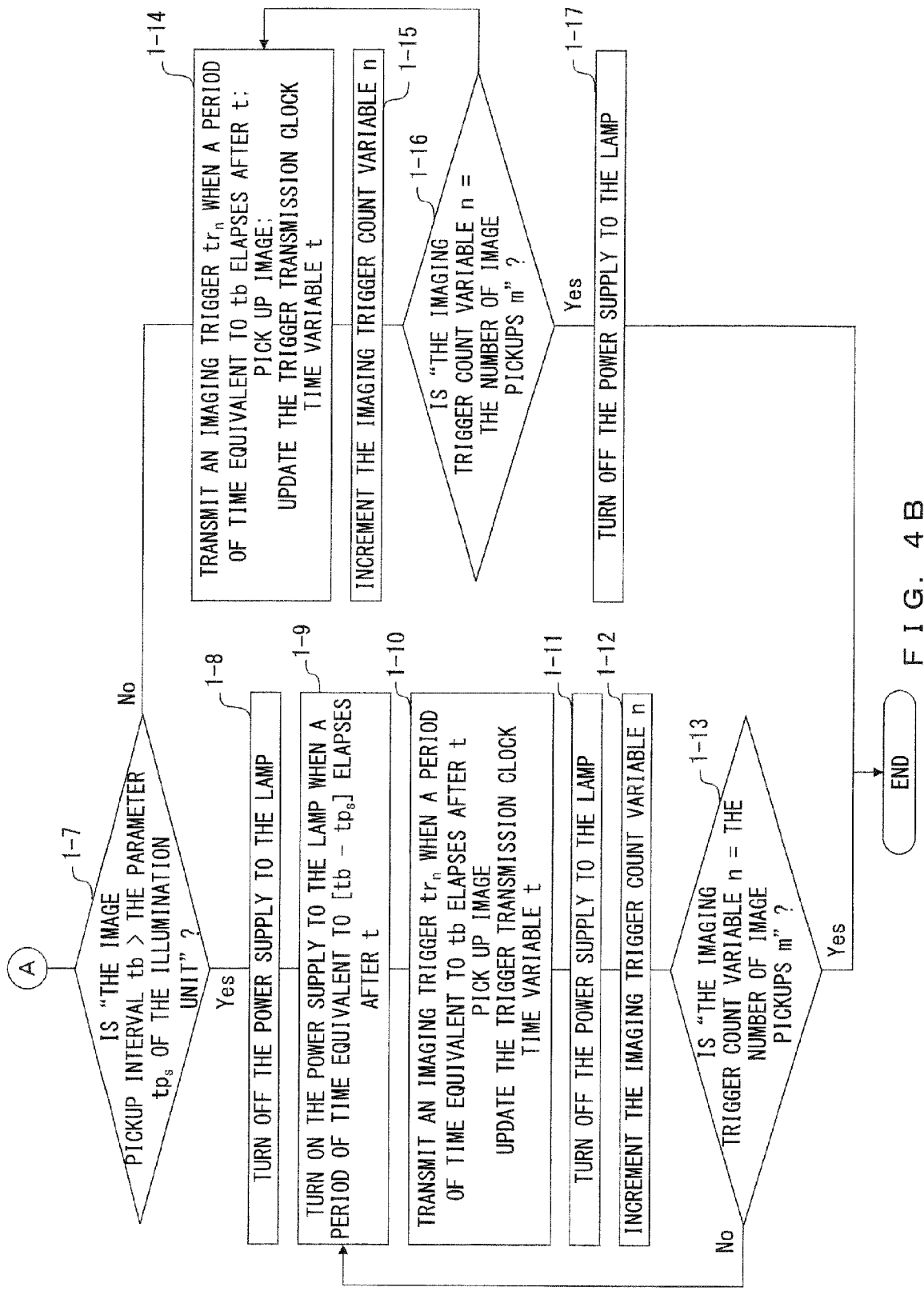
Figure 5A:
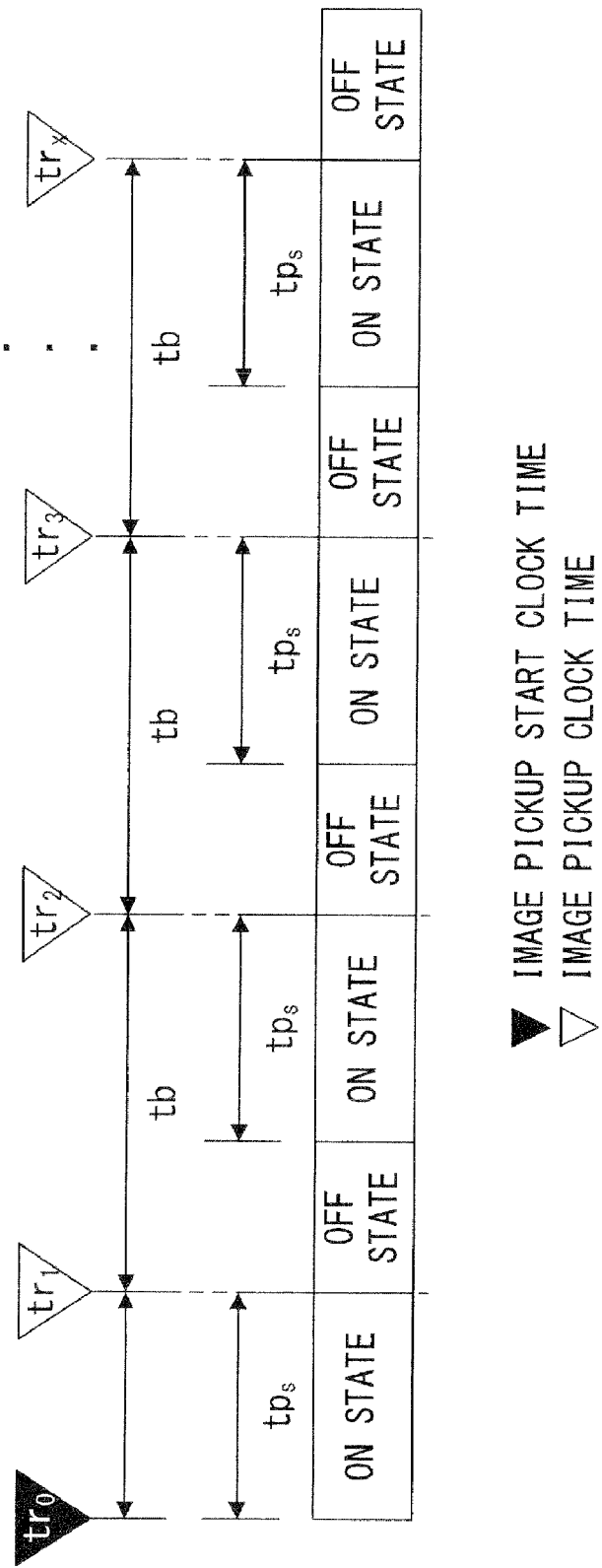
FIG. 5A is a diagram showing a temporal change in the state of an illumination apparatus resulting from the control, exemplified in FIGS. 4A and 4B, in a case in which the image pickup interval is longer than a length of time required for the lighting state of a lamp to be stabilized.

Next is a description of the operation of the microscope system configured as described above, with reference to a flow chart. FIGS. 4A and 4B are flow charts showing an ON/OFF control for the power supply to an illumination apparatus when the image pickup intervals are constant. Further, FIGS. 5A and 5B are diagrams showing temporal changes in the state of an illumination apparatus resulting from the control exemplified in FIGS. 4A and 4B. FIG. 5A exemplifies the case in which the image pickup interval is longer than the length of time required for the lighting state of a lamp to be stabilized, while FIG. 5B exemplifies the case in which the image pickup interval is equal to or shorter than the length of time required for the lighting state of a lamp to be stabilized.

To begin with, the major variables that are used for the present control will be described, that is, an image pickup trigger $tr_n$, an image pickup interval tb, the parameter $tp_s$ of an illumination unit, and a trigger transmission clock time variable t.

The image pickup trigger $tr_n$ is a variable constituting a trigger when an image is picked up. The control apparatus 102 transmitting the trigger to the imaging apparatus 104 causes it to pick up an image of a specimen. The present embodiment is configured to compare the stabilization time of a lamp (i.e., the parameter $tp_s$ of an illumination unit (which is described later)) and an image pickup interval tb, with the transmission clock time of the trigger used as the reference and to judge the ON/OFF state of the power source.

The image pickup interval tb is a variable indicating the image pickup interval during a plurality of times of picking up images. This interval is also an interval of time between transmissions of image pickup trigger to the control apparatus 102. The present exemplary operation is configured to not turn Off the power supply of a lamp until the next image pickup if the stabilization period of the lamp is longer than the image pickup interval.

The parameter $tp_s$ of an illumination unit indicates a period represented by the time between turning On the power supply to the lamp and the time at which the lighting state thereof is stabilized. Until this time period elapses, the lighting state is not stabilized, and therefore the brightness, emission spectrum, and other characteristics are unstable.

The trigger transmission clock time variable t is a variable memorizing the clock time at which an image pickup trigger has been transmitted (i.e., the clock time of picking up an image).

Next is a description of the control according to the present exemplary operation with reference to FIGS. 4A and 4B.

The control of the present exemplary operation is started with a user turning ON the switch of the power supply to the control apparatus 102 and drive management arithmetic operation apparatus 103. When the control is started, a microscope control-use program is read from the ROM 202 and loaded onto the RAM 203 and RAM 303.

Step 1-1: the variables, which are stored in the RAM 203 of the control apparatus 102 and the RAM 303 of the drive management arithmetic operation apparatus 103, are initialized.

Step 1-2: the operation waits until the operation unit 119 connected to the control apparatus 102 inputs the number of image pickups m and an image pickup interval tb. Here, the image pickup interval tb is a constant value. Upon detecting an input, the number of image pickups m and the image pickup interval tb are stored in the RAM 203 comprised in the control apparatus 102.

Step 1-3: the operation waits until the start button on the operation unit 119 is pressed. Upon the user pressing the start button, the power supply to the lamp is turned On (i.e., the clock time $tr_0$ shown in FIG. 5A or 5B). The present clock time is stored in the RAM 203 as a trigger transmission clock time variable t. Furthermore, the trigger transmission clock time variable t is transmitted to the RAM 303 of the drive management arithmetic operation apparatus 103 by way of the data bus 207 and I/O port 204, and is stored in the present RAM 303.

Step 1-4: the CPU 201 transmits, by way of the data bus 207 and I/O port 204, an instruction signal to the CPU 301 of the drive management arithmetic operation apparatus 103 to instruct the CPU 301 to read the parameter $tp_s$ of an illumination unit. The CPU 301 receives the instruction signal and accordingly reads the parameter $tp_s$ of the illumination unit from the ROM 302 and stores it in the RAM 303.

Step 1-5: the CPU 301 transmits an image pickup trigger transmission instruction to the CPU 201 when a period of time equivalent to the parameter $tp_s$ elapses after the clock time of the transmission clock time variable t. Having received the instruction, the CPU 201 transmits an image pickup trigger $tr_n$ to the imaging apparatus 104 by way of the imaging apparatus I/F 206. The imaging apparatus 104 picks up (at the clock time $tr_1$ shown in FIG. 5A) an image of the specimen. Meanwhile, the CPU 201 updates the transmission clock time variable t with the transmission clock time of the image pickup trigger and stores the updated variable in the RAM 203.

Step 1-6: the CPU 301 increments an image pickup trigger count variable n and stores it in the RAM 303.

Step 1-7: the drive management arithmetic operation apparatus 103 reads an image pickup interval tb from the RAM 202 of the control apparatus 102 by way of the data bus 305 and I/O port 304, and stores it in the RAM 303. The CPU 301 compares the image pickup interval tb with the parameter $tp_s$ of the illumination unit using the respective values stored in the RAM 303. If the comparison result is "the image pickup interval tb>the parameter $tp_s$ of the illumination unit", the process shifts to Step 1-8; otherwise, it shifts to Step 1-14.

Step 1-8: the power supply to the lamp is turned OFF.

Step 1-9: the CPU 301 reads the trigger transmission clock time variable t stored in the RAM 203. Then, the CPU 301 transmits an instruction signal to the CPU 201 instructing that the power to the lamp be turned On when a period of time equivalent to "the image pickup interval tb−(minus) the parameter $tp_s$ of the illumination unit" elapses after the clock time t. The CPU 201 turns On the lamp.

Step 1-10: the CPU 301 reads the trigger transmission clock time variable t, and transmits an image pickup trigger transmission instruction to the CPU 201 when a period of time equivalent to the image pickup interval tb elapses after the clock time t. Having received the instruction, the CPU 201 transmits an image pickup trigger $tr_n$ to the imaging apparatus 104 by way of the imaging apparatus I/F 206. The imaging apparatus 104 picks up an image of the specimen (at, for example, the clock time $tr_2$ shown in FIG. 5A). Meanwhile, the CPU 201 updates the trigger transmission clock time variable t with the transmission clock time of the image pickup trigger and stores the updated variable in the RAM 203.

Step 1-11: the power supply to the lamp is turned OFF.

Step 1-12: the CPU 301 increments the image pickup trigger count variable n and stores it in the RAM 303.

Step 1-13: the CPU 301 compares the image pickup trigger count variable n stored in the RAM 303 with the number of image pickups m to judge whether or not the number of image pickups has reached the number of image pickups m. If the judgment result is "the image pickup trigger count variable n=the number of image pickups m", the control is completed. If the number of image pickups has not reached the number of image pickups m, the process shifts to Step 1-9.

Step 1-14: the CPU 301 transmits an image pickup trigger transmission instruction to the CPU 201 when a period of time equivalent to the image pickup interval tb elapses after the clock time of the trigger transmission clock time variable t. Having received the instruction, the CPU 201 transmits an image pickup trigger $tr_n$ to the imaging apparatus 104 by way of the imaging apparatus I/F 206. The imaging apparatus 104 picks up an image of the specimen (at, for example, the clock time $tr_2$ shown in FIG. 5B). Meanwhile, the CPU 201 updates the trigger transmission clock time variable t with the transmission clock time of the image pickup trigger and stores the updated variable in the RAM 203.

Step 1-15: the CPU 301 increments the image pickup trigger count variable n and stores it in the RAM 303.

Step 1-16: the CPU 301 compares the image pickup trigger count variable n stored in the RAM 303 with the number of image pickups m to judge whether or not the number of image pickups has reached the number of image pickups m. If the judgment result is "image pickup trigger count variable n=the number of image pickups m", the process shifts to Step 1-17; otherwise it shifts to Step 1-14.

Step 1-17: the power supply to the lamp is turned OFF, and the control is completed.

The present exemplary operation has shown the example of the turning On/Off of the power supply to a lamp using the stabilization time of the lamp (i.e., the parameter $tp_s$ of the illumination unit), which is a parameter specific to the electric unit, as the initialization requirement time. Such an operation, however, is arbitrary. Alternatively, the initialization requirement time of another motorized drive unit may be used for the control. Further, the initialization requirement time of the lamp may be determined in consideration of the period between the start of the turning on of the lamp and the turning off thereof.

<Exemplary Operation 2>

Figure 6A:
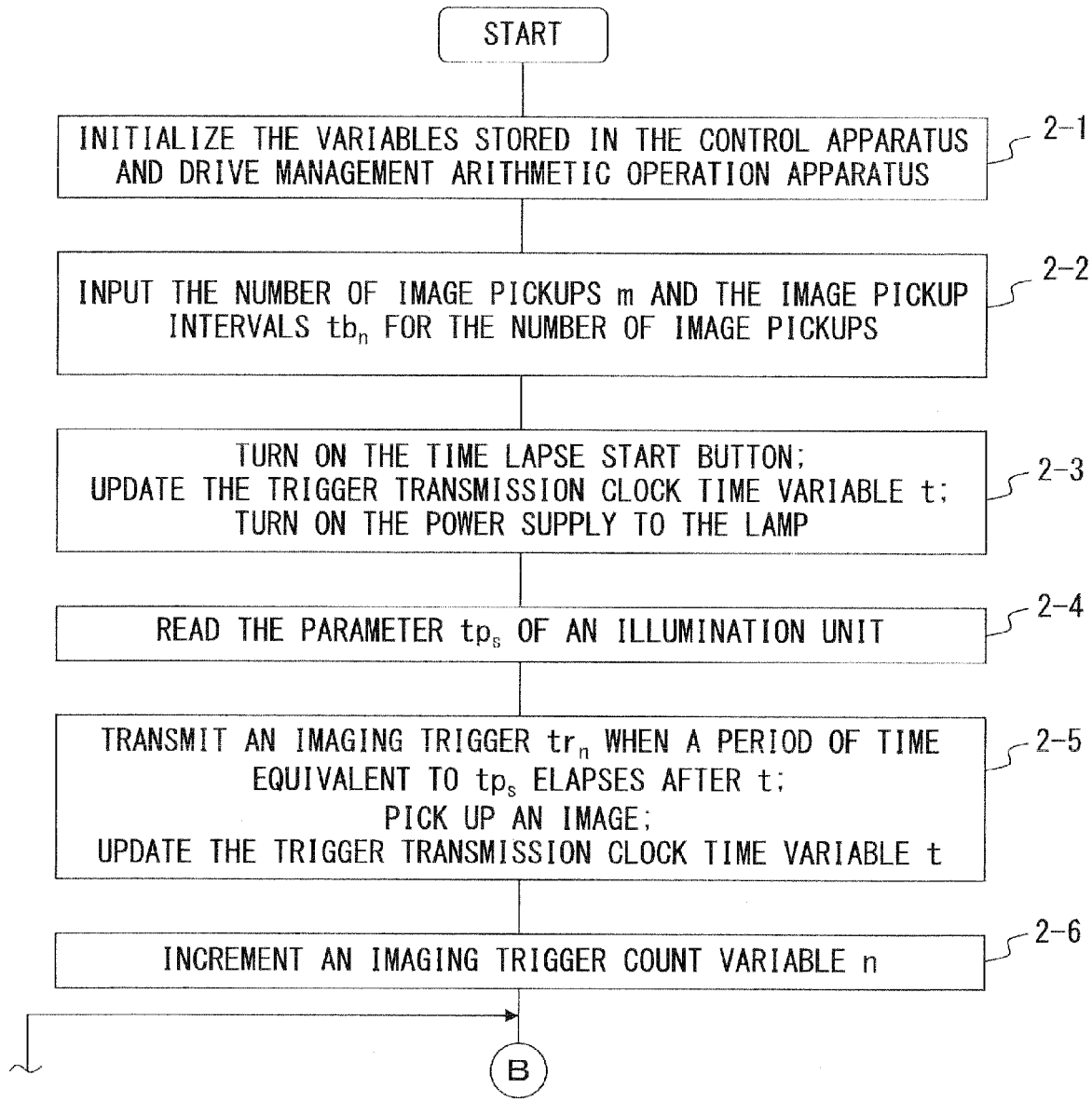
FIGS. 6A and 6B are flow charts showing an ON/OFF control of the power supply to an illumination apparatus when the image pickup intervals are variable.
Figure 6B:
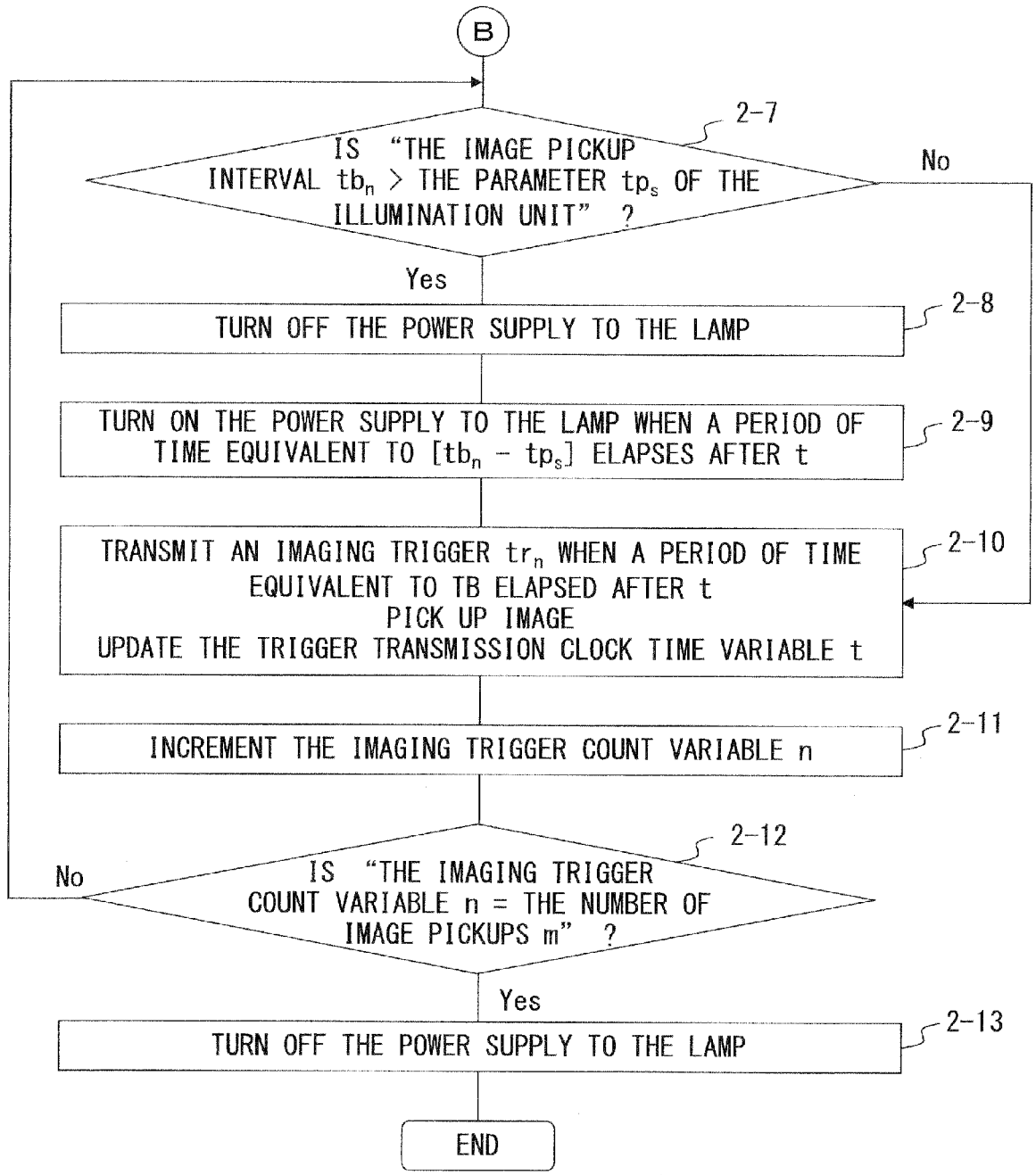
Figure 7:
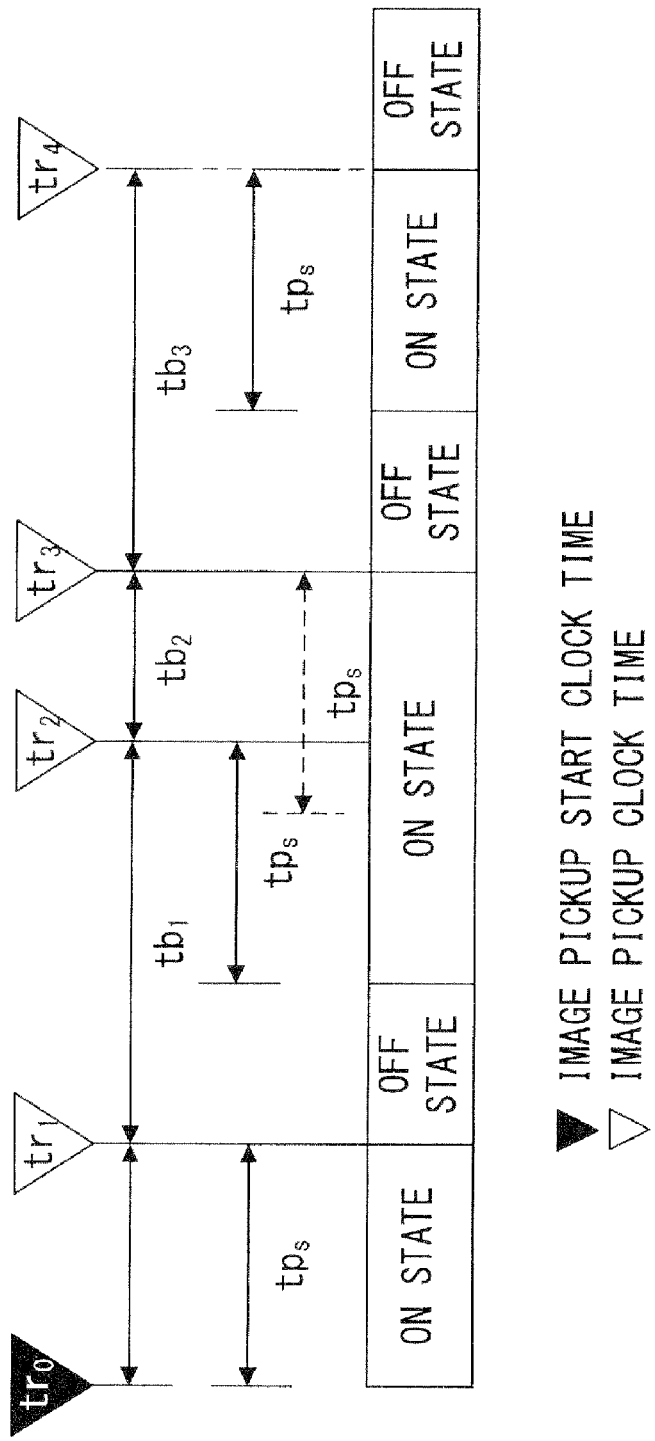
FIG. 7 is a diagram showing a temporal change in the state of an illumination apparatus resulting from the control exemplified in FIGS. 6A and 6B.

FIGS. 6A and 6B are flow charts showing an ON/OFF control for the power supply to an illumination apparatus when the image pickup intervals are variable, that is, when images are picked up by using a plurality of image pickup intervals; and FIG. 7 is a diagram showing a temporal change in the state of the illumination apparatus resulting from the control exemplified in FIGS. 6A and 6B. First, the major variables that are used for the present control will be described, that is, an image pickup trigger $tr_n$, an image pickup interval $tb_n$, the parameter $tp_s$ of an illumination unit, and a trigger transmission clock time variable t.

The image pickup trigger $tr_n$ is a variable constituting a trigger when an image is picked up. The control apparatus 102 transmitting the trigger to the imaging apparatus 104 causes it to pick up an image of a specimen. The present embodiment is configured to compare the stabilization time of a lamp (i.e., the parameter $tp_s$ of an illumination unit (which is described later)) with an image pickup interval tb at the transmission clock time of the trigger used as the reference, and to judge the ON/OFF state of the power source.

The image pickup interval $tb_n$ is a variable indicating the image pickup interval between the nth image pickup and the [n+1]-th image pickup of a plurality of image pickups. The interval is also the interval of the control apparatus 102 transmitting image pickup triggers. The present exemplary operation is configured to not turn OFF the power supply to a lamp if the stabilization period of the lamp is longer than the image pickup interval.

The parameter $tp_s$ of an illumination unit indicates the period between the turning On of the power supply to a lamp and the time at which the lighting state thereof is stabilized. Before this time period elapses, the lighting state is not stabilized, and therefore the brightness, emission spectrum, and other characteristics are unstable.

The trigger transmission clock time variable t is a variable memorizing the clock time at which an image pickup trigger has been transmitted (i.e., the clock time of picking up an image).

Next is a description of the control according to the present exemplary operation with reference to FIGS. 6A and 6B.

The control of the present exemplary operation is started when a user turns On the switch of the power supply to the control apparatus 102 and drive management arithmetic operation apparatus 103. When the control is started, a microscope control-use program is read from the ROM 202 and loaded onto the RAM 203 and RAM 303.

Step 2-1: the variables, which are stored in the RAM 203 of the control apparatus 102 and the RAM 303 of the drive management arithmetic operation apparatus 103, are initialized.

Step 2-2: the operation waits until the operation unit 119 connected to the control apparatus 102 inputs the number of imagings m and m image pickup intervals $tb_n$ (i.e. $tb_1$, $tb_2$, ... $tb_m$) corresponding to the respective image pickups. The input number of imagings m and the image pickup intervals $tb_n$ are stored in the RAM 203 internally comprised in the control apparatus 102.

Step 2-3: the operation waits until the start button on the operation unit 119 is pressed. Upon the pressing of the start button by the user, the power supply to the lamp is turned On (i.e., the clock time $tr_0$ shown in FIG. 7). The present clock time is stored in the RAM 203 as a trigger transmission clock time variable t. Furthermore, the trigger transmission clock time variable t is transmitted to the RAM 303 of the drive management arithmetic operation apparatus 103 by way of the data bus 207 and I/O port 204, and is stored in the present RAM 303.

Step 2-4: the CPU 201 transmits, by way of the data bus 207 and I/O port 204 an instruction signal to the CPU 301 of the drive management arithmetic operation apparatus 103 so as to instruct the CPU 301 to read the parameter $tp_s$ of an illumination unit. The CPU 301 receives the instruction signal and reads the parameter $tp_s$ of the illumination unit from the ROM 302 and stores it in the RAM 303.

Step 2-5: the CPU 301 transmits an image pickup trigger transmission instruction to the CPU 201 when a period of time equivalent to the parameter $tp_s$ of the illumination unit elapses after the clock time of the transmission clock time variable t. Having received the instruction, the CPU 201 transmits an image pickup trigger $tr_n$ to the imaging apparatus 104 by way of the imaging apparatus I/F 206. The imaging apparatus 104 picks up (at the clock time $tr_1$ shown in FIG. 7) an image of the specimen. Meanwhile, the CPU 201 updates the transmission clock time variable t with the transmission clock time of the image pickup trigger and stores the updated variable in the RAM 203.

Step 2-6: the CPU 301 increments an image pickup trigger count variable n and stores it in the RAM 303.

Step 2-7: the drive management arithmetic operation apparatus 103 reads an image pickup interval $tb_n$ from the RAM 202 of the control apparatus 102 by way of the data bus 305 and I/O port 304 and stores the readout interval in the RAM 303. The CPU 301 compares between the image pickup interval $tb_n$ and the parameter $tp_s$ of the illumination unit, both of which are stored in the RAM 303. If the comparison result is "image pickup interval $tb_n$>the parameter $tp_s$ of the illumination unit", the process shifts to Step 2-8; otherwise, it shifts to Step 2-10.

Step 2-8: the power supply to the lamp is turned OFF.

Step 2-9: the CPU 301 reads the trigger transmission clock time variable t stored in the RAM 203. Then, the CPU 301 transmits an instruction signal to the CPU 201 instructing it to turn On the power to the lamp when a period of time equivalent to "the image pickup interval $tb_n$–(minus) the parameter $tp_s$ of the illumination unit" elapses after the clock time t. The CPU 201 turns On the lamp.

Step 2-10: the CPU 301 reads the trigger transmission clock time variable t, and transmits an image pickup trigger transmission instruction to the CPU 201 when a period of time equivalent to the image pickup interval $tb_n$ elapses after the clock time t. Having received the instruction, the CPU 201 transmits an image pickup trigger $tr_n$ to the imaging apparatus 104 by way of the imaging apparatus I/P 206. The imaging apparatus 104 picks up an image of the specimen (at, for example, the clock time $tr_2$ shown in FIG. 7). Meanwhile, the CPU 201 updates the trigger transmission clock time variable t with the transmission clock time of the image pickup trigger and stores the updated variable in the RAM 203.

Step 2-11: the CPU 301 increments the image pickup trigger count variable n and stores it in the RAM 303.

Step 2-12: the CPU 301 compares the image pickup trigger count variable n stored in the RAM 303 with the number of image pickups m to judge whether or not the number of image pickups has reached the number of image pickups m. If the judgment result is "image pickup trigger count variable n=the number of image pickups m", the process shifts to Step 2-13. If the number of image pickups has not reached the number of image pickups m, the process shifts to Step 2-7.

Step 2-13: the power supply to the lamp is turned OFF, and the control is completed.

The present exemplary operation has shown the example of the turning On/Off of the power supply to a lamp using the stabilization time of the lamp (i.e., the parameter $tp_s$ of the illumination unit), which is a parameter specific to the electric unit, as the initialization requirement time. Such an operation, however, is arbitrary. Alternatively, the initialization requirement time of another motorized drive unit may be used for the control.

Incidentally, concerning lamps, the shorter the period of time in which the lamp has been turned off, the shorter the period needed for the lamp to return to a stable state. Taking such a characteristic of a lamp into consideration, the stabilization period (i.e., the parameter $tp_s$ of an illumination unit) of the lamp may be changed on the basis of the turning off time of the lamp.

<Exemplary Operation 3>

Figure 8A:
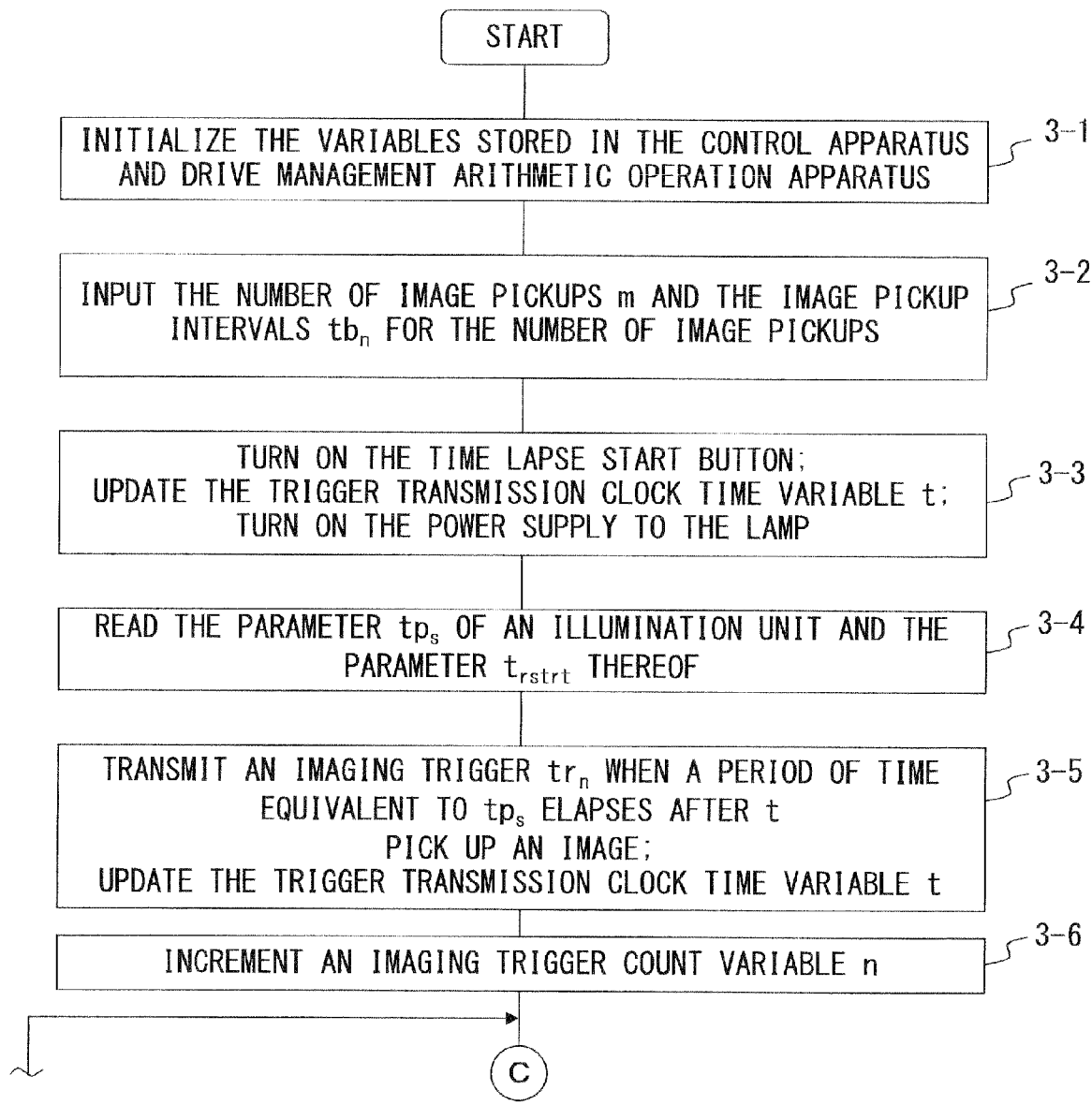
FIGS. 8A and 8B are flow charts showing an ON/OFF control of the power supply to an illumination apparatus when the image pickup intervals are variable.
Figure 8B:
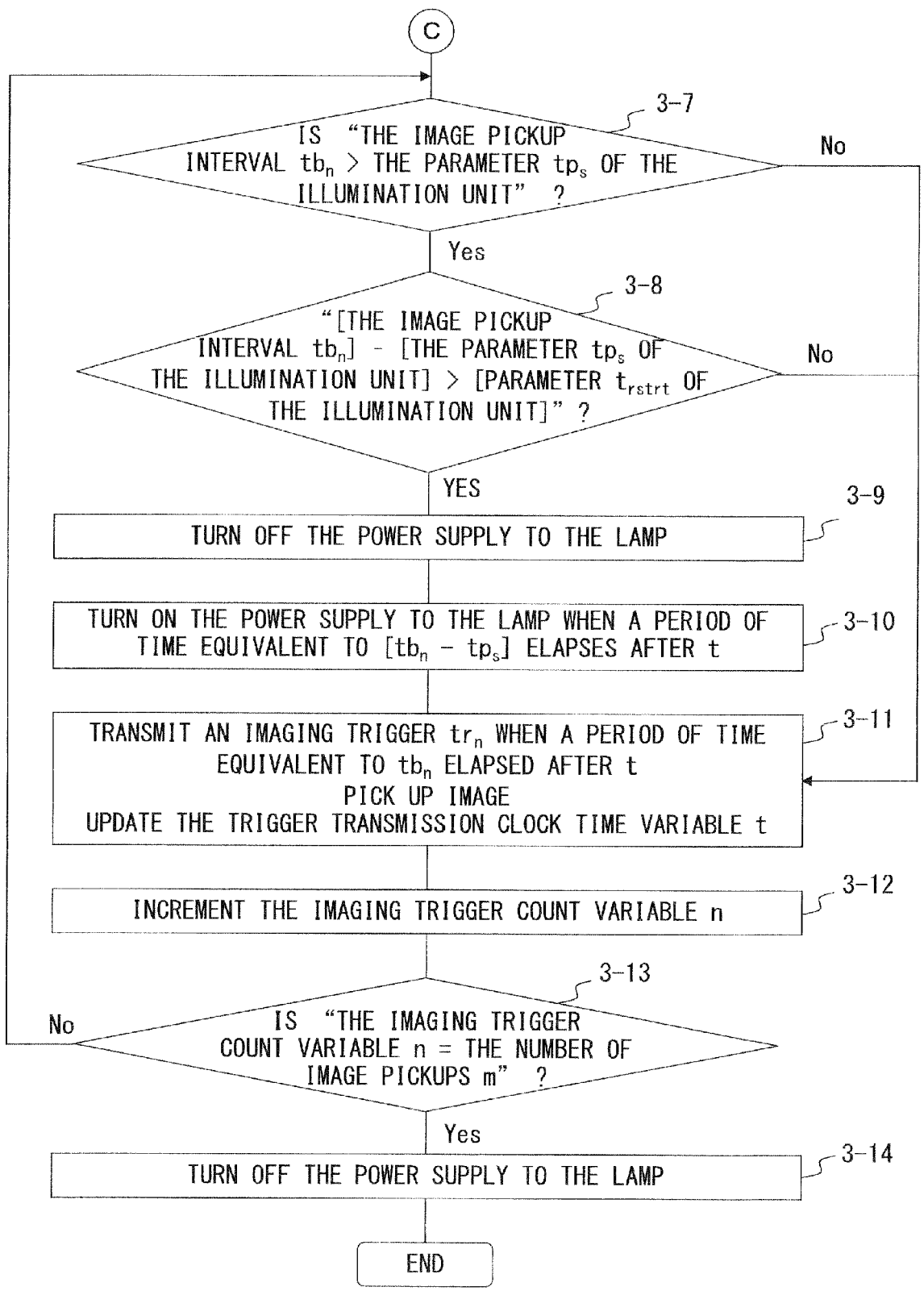
Figure 9:
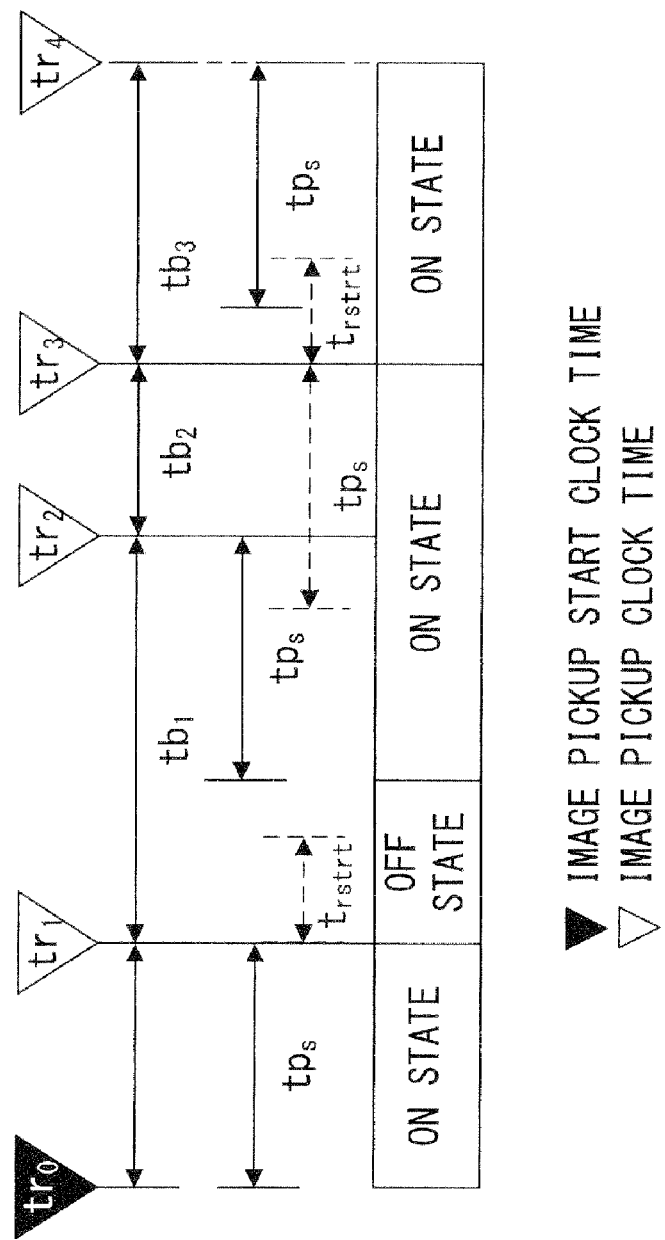
FIG. 9 is a diagram for describing temporal change in the state of an illumination apparatus resulting from the control exemplified in FIGS. 8A and 8B.

FIGS. 8A and 8B are flow charts showing an ON/OFF control for the power supply to an illumination apparatus when the image pickup intervals are variable, that is, when images are picked up by using a plurality of image pickup intervals, as in the case of FIGS. 6A and 6B; FIG. 9 is a diagram showing a temporal change in the state of the illumination apparatus resulting from the control exemplified in FIGS. 8A and 8B. First, the major variables that are used for the present control will be described, that is, an image pickup trigger $tr_n$, an image pickup interval $tb_n$, the parameter $tp_s$ of an illumination unit, the parameter $t_{rstrt}$ of the illumination unit, and a trigger transmission clock time variable t.

The image pickup trigger $tr_n$, an image pickup interval $tb_n$, the parameter $tp_s$ of an illumination unit, and trigger transmission clock time variable t are similar to those used in the exemplary operation 2 and therefore a duplicate description is not provided here.

The parameter $t_{rstrt}$ of the illumination unit indicates a period of time up to the power supply to a lamp being turned On again after it is turned Off, which is a period of time to be secured. Generally, an operation of lighting (i.e., turning On the power source) a lamp used for an illumination unit immediately after extinguishing it (i.e., turning Off the power source) constitutes a cause to deteriorate the life of the lamp substantially. For example, in the case of a mercury amp, which is a representative lamp, turning On within 30 minutes of turning Off is not recommended.

The control according to the present exemplary operation is devised to judge whether or not a period of time before a restart that needs to be secured can be secured, in addition to judging whether or not a period of time required for a stable lighting of a lamp can be secured. Controlling the power On/Off of the lamp on the basis of the collective judgment result makes it possible to attain a good illumination performance and a high utilization rate with the failure and/or wear of the device suppressed.

Next is a description of the control according to the present exemplary operation with reference to FIGS. 8A and 8B.

The control according to the present exemplary operation is started with the user turning On the switch of the power sources to the control apparatus 102 and drive management arithmetic operation apparatus 103. When the control is started, a microscope system control-use program is read from the ROM 202 and loaded onto the RAM 203 and RAM 303.

Step 3-1: the variables, which are stored in the RAM 203 of the control apparatus 102 and the RAM 303 of the drive management arithmetic operation apparatus 103, are initialized.

Step 3-2: the operation waits until the operation unit 119 connected to the control apparatus 102 inputs the number of imagings m and m image pickup intervals $tb_n$ (i.e. $tb_1$, $tb_2$, ... $tb_m$) corresponding to the respective image pickups. The input number of imagings m and the image pickup intervals $tb_n$ are stored in the RAM 203 internally comprised in the control apparatus 102.

Step 3-3: the operation waits until the start button on the operation unit 119 is pressed. Upon the pressing of the start button by the user, the power supply to the lamp is turned On (i.e., the clock time $tr_0$ shown in FIG. 9). The present clock time is stored in the RAM 203 as a trigger transmission clock time variable t. Furthermore, the trigger transmission clock time variable t is transmitted to the RAM 303 of the drive management arithmetic operation apparatus 103 by way of the data bus 207 and I/O port 204, and is stored in the present RAM 303.

Step 3-4: the CPU 201 transmits, by way of the data bus 207 and I/O port 204, an instruction signal to the CPU 301 of the drive management arithmetic operation apparatus 103 so as to instruct the CPU 301 to read the parameter $tp_s$ of an illumination unit and the parameter $t_{rstrt}$ thereof. The CPU 301 receives the instruction signal, and reads the parameter $tp_s$ of the illumination unit and the parameter $t_{rstrt}$ thereof from the ROM 302 and stores them in the RAM 303.

Step 3-5: the CPU 301 transmits an image pickup trigger transmission instruction to the CPU 201 when a period of time equivalent to the parameter $tp_s$ of the illumination unit elapses after the clock time of the transmission clock time variable t. Having received the instruction, the CPU 201 transmits an image pickup trigger $tr_n$ to the imaging apparatus 104 by way of the imaging apparatus I/F 206. The imaging apparatus 104 picks up (at the clock time $tr_1$ shown in FIG. 9) an image of the specimen. Meanwhile, the CPU 201 updates the transmission clock time variable t with the transmission clock time of the image pickup trigger and stores the updated variable in the RAM 203.

Step 3-6: the CPU 301 increments an image pickup trigger count variable n and stores it in the RAM 303.

Step 3-7: the drive management arithmetic operation apparatus 103 reads an image pickup interval $tb_n$ from the RAM 202 of the control apparatus 102 by way of the data bus 305 and I/O port 304 and stores the readout interval in the RAM 303. The CPU 301 compares the image pickup interval $tb_n$ with the parameter $tp_s$ of the illumination unit, both of which are stored in the RAM 303. If the comparison result is "the image pickup interval $tb_n$>the parameter $tp_s$ of the illumination unit", the process shifts to Step 3-8; otherwise it shifts to Step 3-11.

Step 3-8: the CPU 301 uses the image pickup interval $tb_n$, the parameter $tp_s$ of the illumination unit, and the parameter $t_{rstrt}$ thereof to compare the difference between the image pickup interval $tb_n$ and the parameter $tp_s$ of the illumination unit with the parameter $t_{rstrt}$ thereof. If the comparison result shows "[the image pickup interval $tb_n$]−[the parameter $tp_s$ of the illumination unit]>[the parameter $t_{rstrt}$ of the illumination unit]", the process shifts to Step 3-9; otherwise, it shifts to Step 3-11.

Step 3-9: the power supply to the lamp is turned OFF.

Step 3-10: the CPU 301 reads the trigger transmission clock time variable t stored in the RAM 203. Then, the CPU 301 transmits an instruction signal to the CPU 201 instructing it to turn On the power to the lamp when a period of time equivalent to "the image pickup interval $tb_n$−(minus) the parameter $tp_s$ of the illumination unit" elapses after the clock time t. The CPU 201 turns On the lamp.

Step 3-11: the CPU 301 reads the trigger transmission clock time variable t and transmits an image pickup trigger transmission instruction to the CPU 201 when a period of time equivalent to the image pickup interval $tb_n$ elapses after the clock time t. Having received the instruction, the CPU 201 transmits an image pickup trigger $tr_n$ to the imaging apparatus 104 by way of the imaging apparatus I/F 206. The imaging apparatus 104 picks up an image of the specimen (at, for example, the clock time $tr_2$ shown in FIG. 9). Meanwhile, the CPU 201 updates the trigger transmission clock time variable t with the transmission clock time of the image pickup trigger and stores the updated variable in the RAM 203.

Step 3-12: the CPU 301 increments the image pickup trigger count variable n and stores it in the RAM 303.

Step 3-13: the CPU 301 compares the image pickup trigger count variable n stored in the RAM 303 with the number of image pickups m to judge whether or not the number of image pickups has reached the desired number of image pickups m. If the judgment result is "the image pickup trigger count variable n=the number of image pickups m", the process shifts to Step 3-14. If the number of image pickups has not reached the desired number of image pickups m, the process shifts to Step 3-7.

Step 3-14: the power supply to the lamp is turned OFF, and the control is completed.

The present exemplary operation has shown the example of the turning On/Off of the power supply to a lamp using the stabilization time of the lamp (i.e., the parameter $tp_s$ of the illumination unit), which is a parameter specific to the electric unit, as the initialization requirement time. Such an operation, however, is arbitrary. Alternatively, the initialization requirement time of another motorized drive unit may be used for the control.

Incidentally, concerning a lamp, the shorter the period in which the lamp has been turned off, the shorter the period needed for the lamp to return to a stable state. Taking such characteristic of a lamp into consideration, the stabilization period (i.e., the parameter $tp_s$ of an illumination unit) of the lamp may be changed on the basis of the turning off time of the lamp.

What is claimed is:

1. A microscope system, comprising:
   an imaging apparatus for picking up an image of a specimen;
   an electric unit;
   a control apparatus for controlling turning On/Off of a power supply to the electric unit;
   a storage apparatus recording an initialization requirement period of the electric unit; and
   a drive management arithmetic operation apparatus for calculating, on the basis of an image pickup interval and the initialization requirement period, a clock time for controlling turning On/Off of the power supply to the electric unit.

2. The microscope system according to claim 1, wherein the drive management arithmetic operation apparatus compares the initialization requirement period with the image pickup interval, wherein
   the control apparatus controls turning On/Off of the power supply to the electric unit on the basis of the comparison result produced by the drive management arithmetic operation apparatus.

3. The microscope system according to claim 1, wherein the image pickup interval is constant, wherein
   the control apparatus performs a control for turning Off the power supply and for turning On the power supply between image pickups if the following condition is satisfied:

$tb > tp_s$, whereas the control apparatus maintains the power supply in a turned on state between image pickups if the following condition is satisfied:

$$tb \leq tp_s,$$

where "$tp_s$" is the initialization requirement period and "tb" is the image pickup interval.

4. The microscope system according to claim 3, wherein the control apparatus maintains the power in a turned Off state during a period equivalent to [$tb-tp_s$] after the clock time of the nth image pickup, and maintains the power in a turned On state during a period equivalent to $tp_s$ immediately before the clock time of the [n+1]-th image pickup is reached, if the following condition is satisfied:

$$tb > tp_s.$$

5. The microscope system according to claim 1, wherein the control apparatus performs a control for turning Off the power supply and turning it On between the nth image pickup and the [n+1]-th image pickup if the following condition is satisfied:

$$tb_n > tp_s,$$

whereas the control apparatus maintains the power supply in a turned On state between the nth image pickup and [n+1]-th image pickup if the following condition is satisfied:

$$tb_n \leq tp_s,$$

where "$tp_s$" is the initialization requirement period, "n" is a natural number, and "$tb_n$" is the image pickup interval between the nth image pickup and the [n+1]-th image pickup.

6. The microscope system according to claim 5, wherein the control apparatus maintains the power supply in a turned Off state during a period equivalent to [$tb_n-tp_s$] after the clock time of the nth image pickup, and the control apparatus maintains the power supply in a turned On state during a period equivalent to $tp_s$ immediately before the clock time of the [n+1]-th image pickup is reached, if the following condition is satisfied:

$$tb_n > tp_s.$$

7. The microscope system according to claim 1, wherein the drive management arithmetic operation apparatus compares the image pickup interval with the sum of the initialization requirement period and a period of time from turning Off of the power supply to turning it On, which is a period of time to be secured, so that the control apparatus controls turning On/Off of the power supply to the electric unit on the basis of the comparison result produced by the drive management arithmetic operation apparatus.

8. The microscope system according to claim 1, wherein the image pickup interval is constant, wherein the control apparatus performs a control for turning Off the power supply and a control for turning On the power supply between image pickups if the following condition is satisfied:

$$[tb - t_{rstrt}] > tp_s,$$

whereas the control apparatus maintains the power supply turned On between image pickups if the following condition is satisfied:

$$[tb - t_{rstrt}] \leq tp_s,$$

where "$tp_s$" is the initialization requirement period, "tb" is the image pickup interval, and "$t_{rstrt}$" is a period of time from turning Off the power supply to turning it On, which is a period of time to be secured.

9. The microscope system according to claim 8, wherein the control apparatus maintains the power supply in a turned Off state during a period equivalent to [$tb-tp_s$] after a clock time of picking up an image and maintains the power supply in a turned On state during a period equivalent to $tp_s$ immediately before a clock time of picking the next image is reached, if the following condition is satisfied:

$$[tb - t_{rstrt}] > tp_s.$$

10. The microscope system according to claim 1, wherein the control apparatus performs a control for turning Off the power supply and a control for turning it On between the nth image pickup and the [n+1]-th image pickup if the following condition is satisfied:

$$[tb_n - t_{rstrt}] > tp_s,$$

whereas the control apparatus maintains the power supply in a turned On state between the nth image pickup and [n+1]-th image pickup if the following condition is satisfied:

$$[tb_n - t_{rstrt}] \leq tp_s,$$

where "$tp_s$" is the initialization requirement period, "n" is a natural number, "$tb_n$" is the image pickup interval between the nth image pickup and the [n+1]-th image pickup, and "$t_{rstrt}$" is a period of time from turning Off the power supply to turning it On, which is a period of time to be secured.

11. The microscope system according to claim 10, wherein the control apparatus maintains the power supply in a turned Off state during a period equivalent to [$tb_n-tp_s$] from the clock time of picking up the nth image, and maintains the power supply in a turned On state during a period equivalent to $tp_s$ immediately before the clock time of picking up the [n+1]-th image is reached, if the following condition is satisfied:

$$[tb_n - t_{rstrt}] > tp_s.$$

12. The microscope system according to claim 1, further comprising an operation unit used for inputting the image pickup interval.

13. The microscope system according to claim 1, wherein the electric unit is an illumination apparatus.

14. The microscope system according to claim 13, wherein the initialization requirement period is a period of time required for stabilization of the emission state of an illumination light emitted from an illumination apparatus.

15. A control method applied to a microscope system for picking up an image of a specimen, the method comprising:

a first step for comparing an image pickup interval with the initialization requirement period of an electric system;

a second step for controlling turning On/Off of a power supply to the electric system on the basis of the comparison result performed in the first step; and a third step for picking up an image of the specimen.

16. The control method applied to a microscope system according to claim 15, wherein
the second step comprises:
a fourth step for turning Off the power supply; and
a fifth step for turning On the power supply, if the following condition is satisfied:

$$tb_n > tp_s,$$

where "$tb_n$" is the image pickup interval between the nth image pickup and the [n+1]-th image pickup, "n" is a natural number, and "$tp_s$" is the initialization requirement period.

17. The control method applied to a microscope system according to claim 15, wherein
the second step comprises:
a fourth step for turning Off the power supply and maintaining the power supply in a turned Off state during a period equivalent to $[tb_n - tp_s]$; and
a fifth step for turning On the power supply and maintaining the power supply in a turned On state during a period equivalent to $tp_s$, if the following condition is satisfied:

$$tb_n > tp_s,$$

where "$tb_n$" is the image pickup interval between the nth image pickup and the [n+1]-th image pickup, "n" is a natural number, and "$tp_s$" is the initialization requirement period.

18. The control method applied to a microscope system according to claim 15, wherein
the second step comprises:
a fourth step for turning Off the power supply; and
a fifth step for turning On the power supply, if the following condition is satisfied:

$$[tb_n - t_{rstrt}] > tp_s,$$

where "$tb_n$" is the image pickup interval between the nth image pickup and the [n+1]-th image pickup, "n" is a natural number, "$tp_s$" is the initialization requirement period and "$t_{rstrt}$" is a period of time from turning Off the power supply to turning it On, which is a period of time to be secured.

19. The control method applied to a microscope system according to claim 15, wherein
the second step comprises:
a fourth step for turning Off the power supply and maintaining the power supply in a turned Off state during a period equivalent to $[tb_n - tp_s]$; and
a fifth step for turning On the power supply and maintaining the power supply in a turned On state during a period equivalent to $tp_s$,
if the following condition is satisfied:

$$[tb_n - t_{rstrt}] > tp_s,$$

where "$tb_n$" is the image pickup interval between the nth image pickup and the [n+1]-th image pickup, "n" is a natural number, "$tp_s$" is the initialization requirement period, and "$t_{rstrt}$" is a period of time from turning Off the power supply to turning it On, which is a period of time to be secured.

* * * * *